(12) United States Patent
Klein et al.

(10) Patent No.: US 8,988,045 B2
(45) Date of Patent: Mar. 24, 2015

(54) METHOD FOR CHARGING OR DISCHARGING A BATTERY IN ORDER TO DETERMINE THE END OF CHARGING OR DISCHARGING ON THE BASIS OF MEASUREMENTS OF CURRENT AND TEMPERATURE

(75) Inventors: Jean-Marie Klein, Tresserve (FR); Arnaud Delaille, Bassens (FR); Sylvie Genies, Saint Egreve (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 349 days.

(21) Appl. No.: 13/503,557

(22) PCT Filed: Oct. 26, 2010

(86) PCT No.: PCT/FR2010/000703
§ 371 (c)(1),
(2), (4) Date: Apr. 23, 2012

(87) PCT Pub. No.: WO2011/051575
PCT Pub. Date: May 5, 2011

(65) Prior Publication Data
US 2012/0212184 A1   Aug. 23, 2012

(30) Foreign Application Priority Data

Oct. 29, 2009   (FR) ..................................... 09 05201

(51) Int. Cl.
*H02J 7/00*   (2006.01)
*H02J 7/04*   (2006.01)
(Continued)

(52) U.S. Cl.
CPC ........... *H01M 10/443* (2013.01); *H02J 7/0083* (2013.01); *H02J 7/0091* (2013.01);
(Continued)

(58) Field of Classification Search
CPC ... Y02E 60/12; G01R 31/3648; H01M 10/44; H01M 10/446; H01M 10/448; H02J 7/04; H02J 7/045; H02J 7/047
USPC ................. 320/127–128, 132–137, 148–153, 320/155–157, 159, 161, 164
See application file for complete search history.

(56) References Cited

U.S. PATENT DOCUMENTS 4,677,363 A * 6/1987 Kopmann ..................... 320/131
5,592,094 A * 1/1997 Ichikawa ...................... 324/427
(Continued)

FOREIGN PATENT DOCUMENTS

EP   0 768 745 A2   4/1997
EP   0 982 829 A2   3/2000
(Continued)

OTHER PUBLICATIONS

Jun. 5, 2012 Translation of International Preliminary Report on Patentability issued in International Patent Application No. PCT/FR2010/000703.
(Continued)

*Primary Examiner* — Stacy Whitmore
(74) *Attorney, Agent, or Firm* — Oliff PLC

(57) ABSTRACT

The method for charging or discharging a battery comprises measurement of the voltage at the terminals of the battery and comparison of the measured voltage with an end of charging or discharging voltage threshold. The method also comprises measurement of a temperature representative of the temperature of the battery and measurement of the current flowing in the battery to form a pair of measurements. The voltage threshold is then determined according to the pair of measurements. Charging or discharging of the battery is stopped when the voltage threshold is reached.

23 Claims, 3 Drawing Sheets

(51) Int. Cl.
  *H02J 7/06* (2006.01)
  *H02J 7/24* (2006.01)
  *H01M 10/44* (2006.01)
  *H01M 10/46* (2006.01)
  *H01M 10/052* (2010.01)

(52) U.S. Cl.
  CPC .......... *H01M 10/448* (2013.01); *H01M 10/052* (2013.01)
  USPC .......... 320/127; 320/128; 320/132; 320/133; 320/134; 320/135; 320/136; 320/137; 320/148; 320/149; 320/150; 320/151; 320/152; 320/153; 320/155; 320/156; 320/157; 320/159; 320/161; 320/164

(56) References Cited

U.S. PATENT DOCUMENTS

| | | | |
|---|---|---|---|
| 5,659,239 A | 8/1997 | Sanchez et al. | |
| 5,686,815 A * | 11/1997 | Reipur et al. | 320/116 |
| 6,075,342 A * | 6/2000 | Koenck | 320/125 |
| 6,114,831 A | 9/2000 | Attimont et al. | |
| 6,252,377 B1 | 6/2001 | Shibutani et al. | 320/132 |
| 6,300,763 B1 * | 10/2001 | Kwok | 324/427 |
| 6,453,249 B1 * | 9/2002 | Shibutani et al. | 702/63 |
| 6,489,743 B1 | 12/2002 | Alzieu et al. | |
| 6,618,681 B2 | 9/2003 | Hoenig et al. | 702/63 |
| 6,804,100 B2 * | 10/2004 | Astala | 361/93.2 |
| 7,969,120 B2 | 6/2011 | Plett | 320/145 |
| 8,253,380 B2 * | 8/2012 | Sun et al. | 320/128 |
| 8,450,978 B2 | 5/2013 | Barsukov et al. | 320/136 |
| 8,466,685 B2 | 6/2013 | Kirchev | 324/427 |
| 8,749,204 B2 * | 6/2014 | Majima et al. | 320/149 |
| 8,765,306 B2 | 7/2014 | Amiruddin et al. | 429/231.95 |
| 2001/0021092 A1 * | 9/2001 | Astala | 361/90 |
| 2002/0093312 A1 * | 7/2002 | Choo | 320/149 |
| 2003/0184446 A1 | 10/2003 | Romano et al. | |
| 2005/0099161 A1 * | 5/2005 | Sato | 320/134 |
| 2005/0110466 A1 * | 5/2005 | Shoji | 320/150 |
| 2005/0225301 A1 * | 10/2005 | Arnold et al. | 320/150 |
| 2005/0237027 A1 * | 10/2005 | Sasaki et al. | 320/132 |
| 2005/0253561 A1 * | 11/2005 | Tibbs | 320/150 |
| 2006/0066285 A1 * | 3/2006 | Minamiura | 320/132 |
| 2006/0152196 A1 * | 7/2006 | Matsumoto et al. | 320/132 |
| 2008/0197813 A1 * | 8/2008 | Asakura et al. | 320/150 |
| 2008/0278111 A1 | 11/2008 | Genies et al. | |
| 2009/0085527 A1 * | 4/2009 | Odaohhara | 320/150 |
| 2009/0200986 A1 * | 8/2009 | Kopera | 320/134 |
| 2009/0295334 A1 * | 12/2009 | Yang et al. | 320/134 |
| 2010/0001693 A1 * | 1/2010 | Iida et al. | 320/134 |
| 2010/0072948 A1 * | 3/2010 | Sun et al. | 320/134 |
| 2010/0090650 A1 * | 4/2010 | Yazami et al. | 320/132 |
| 2011/0109273 A1 * | 5/2011 | Tamezane | 320/132 |
| 2011/0234167 A1 * | 9/2011 | Kao et al. | 320/132 |
| 2011/0313613 A1 * | 12/2011 | Kawahara et al. | 701/29 |
| 2012/0049802 A1 * | 3/2012 | Barsukov et al. | 320/136 |
| 2012/0112700 A1 * | 5/2012 | Morimoto et al. | 320/132 |
| 2012/0176095 A1 * | 7/2012 | Okuda et al. | 320/134 |
| 2012/0176097 A1 * | 7/2012 | Takezawa et al. | 320/134 |
| 2012/0256569 A1 * | 10/2012 | Kawahara et al. | 318/139 |
| 2013/0207613 A1 * | 8/2013 | Loncarevic | 320/134 |
| 2014/0023888 A1 * | 1/2014 | Fulop et al. | 429/50 |

FOREIGN PATENT DOCUMENTS

| | | |
|---|---|---|
| EP | 1 990 890 A1 | 11/2008 |
| FR | 2 780 827 A1 | 1/2000 |
| JP | A-2000-102183 | 4/2000 |
| JP | A-2000-217261 | 8/2000 |

OTHER PUBLICATIONS

Dec. 6, 2011 International Search Report issued in International Patent Application No. PCT/FR2010/000703.
Jul. 8, 2014 Office Action issued in Japanese Application No. 2012-535895 (with translation).
Chinese Office Action dated Apr. 1, 2014 from Chinese Patent Application No. 201080055676.0 (with English-language translation).

* cited by examiner

METHOD FOR CHARGING OR DISCHARGING A BATTERY IN ORDER TO DETERMINE THE END OF CHARGING OR DISCHARGING ON THE BASIS OF MEASUREMENTS OF CURRENT AND TEMPERATURE

BACKGROUND OF THE INVENTION

The invention relates to a method for charging or discharging a battery.

STATE OF THE ART

In order to optimize operation of batteries, it has been necessary to develop regulators responsible for management of different charging and/or discharging strategies. New technologies are increasingly oriented towards the use of renewable energy sources either enabling current to be input to an electric power system for direct use or the current generated in a battery to be stored for future use.

A known regulation mode is On/Off regulation, this type being based on interruption of charging when the voltage reaches a first High Voltage Disconnect (HVD) threshold and resuming charging when the voltage reaches a second High Voltage Reconnect (HVR) threshold. Regulation of On/Off type is often used in the photovoltaic field in which end-of-charging criteria are in general lacking. Use of the system by a user in fact enables the battery to be discharged while at the same time terminating regulation. However, without any action from the user, extended non-use of the system can lead to overcharging of the battery which is liable to damage the latter.

It is possible to determine end of charging by fixing a maximum duration for regulation. However this criterion is hardly ever used as the charging time on regulation to reach full charge of the battery is variable according to the charging current rate, the type of battery used or the state of health of the battery.

Management of end of charging is however particularly crucial to achieve a given state of charge of a battery while at the same time limiting certain disturbance reactions, in particular electrolysis of water as far as batteries with a water electrolyte are concerned.

Limiting these disturbance reactions is a major issue in order at the same time:
- to limit the maintenance requirements of batteries called open batteries in which it is possible to add water to compensate for losses,
- to ensure safety of sealed batteries in which it is not possible to add water and in which excess charging can lead to thermal racing and/or explosion,
- and finally to optimize the lifetime of batteries.

The document EP1990890 describes a charging method using two charging modes controlled by a charge control unit. In the first charging mode, charging is of controlled current type, and in the second charging mode, charging is of controlled voltage type. In the first charging mode, the method comprises a voltage threshold value which is a function of a temperature and of a charging current. When the voltage threshold value is reached, the control unit changes behaviour and end of charging is detected to stop charging when a rapid temperature increase of the battery occurs or if the value of the charging current reaches a predefined threshold.

OBJECT OF THE INVENTION

The object of the invention consists in performing charging or discharging of a battery by stopping charging or discharging at the right time, so as to optimize the lifetime of the battery.

This object is achieved by the appended claims and more particularly by the fact that the method comprises the following steps:
- measuring a voltage at the terminals of the battery,
- determining an end of charging or discharging voltage threshold according to a pair of measurements formed by measurement of the temperature representative of the temperature of the battery and measurement of the current flowing in the battery,
- comparing the measured voltage with the end of charging or discharging voltage threshold,
- stopping charging or discharging when the voltage threshold is reached.

BRIEF DESCRIPTION OF THE DRAWINGS

Other advantages and features will become more clearly apparent from the following description of particular embodiments of the invention given for non-restrictive example purposes only and represented in the accompanying drawings, in which.

DESCRIPTION OF PREFERRED EMBODIMENTS

Figure 1:
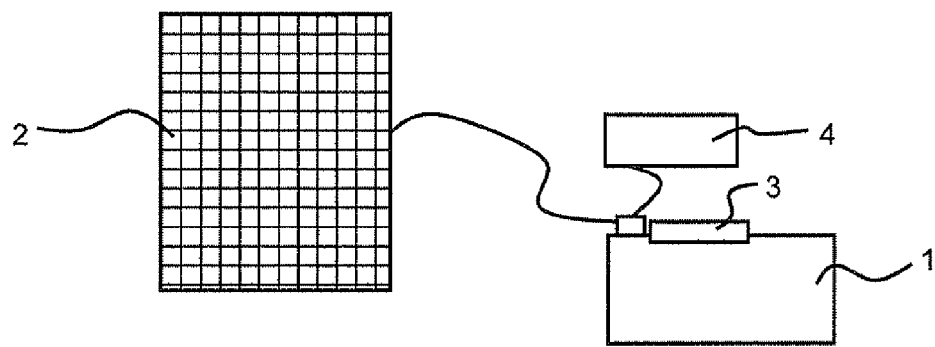
FIG. 1 represents an example of a standalone system.

As illustrated in FIG. 1, a standalone system generally comprises a renewable energy source connected to a battery 1. Battery 1 is recharged by the renewable energy source that is able to be of solar energy, wind power, hydraulic power or geothermal power type. By definition, renewable energy sources are not dependable in continuity of provision of services, i.e. they do not produce current at a constant rate. This lack of constancy makes the use of conventional charging and discharging methods null and void. In FIG. 1, battery 1 is recharged by at least one solar panel 2, which means that simple cloud cover can reduce the intensity of the charging current or even interrupt charging of the battery if the sunlight conditions are too unfavorable.

The charging or discharging characteristics of a battery can thus vary according to the charge/discharge state and the temperature of battery 1. Making charging dependent on a renewable energy source therefore makes it difficult to determine the moment when charging is to be stopped. In the same way, to prevent degradation of the battery, it is also preferable not to perform too deep discharging of the latter, the same charging principles therefore applying to discharging of battery 1.

Although the method described in the following is particularly suitable for a battery connected to a renewable energy source, it can also be adapted to suit any type of battery connected to a variable current power source.

The method for charging or discharging a battery 1 preferably connected to a renewable energy source 2 thus comprises at least measurement of the voltage $U_b$ at the terminals of battery 1 and comparison of the measured voltage $U_b$ with an end of charging or discharging voltage threshold. The method further comprises measurement of a temperature $T_b$ representative of the temperature of battery 1 and measurement of the current $I_b$ flowing in the battery, thus forming a pair of measurements ($T_b$, $I_b$). By convention, if the current is negative, the battery discharges, otherwise it recharges. The voltage threshold is determined according to the pair of measurements formed by measurement of temperature $T_b$ and measurement of current $I_b$. The voltage threshold can in fact vary according to the conditions of use, i.e. according to the charge or respectively discharge current, and to the temperature $T_b$ of battery 1. The voltage threshold, determined from the pair of measurements, then enables corrections to be made with finely tuning the end of charging or discharging criterion.

If measured voltage Ub reaches the voltage threshold, charging or discharging of the battery is then stopped. What is meant by stopped is that the end of charging or discharging criterion of the battery is reached. In this case, charging will not be resumed until the measured voltage drops below the voltage threshold. In the same way, when the end of discharging criterion is reached, discharging will not be resumed so long as the measured voltage remains below the voltage threshold.

What is meant by measured current Ib is either the instantaneous current or a mean of the current measured over a set time period.

Measurements of voltage $U_b$ at the terminals of battery 1, of current $I_b$ flowing in the battery and of temperature $T_b$ of battery 1, are preferably performed simultaneously. This enables a precise image of the characteristics of charging or discharging to be obtained at the time the measurements are made.

The different measurements are preferably made cyclically so as to know the properties of the battery at regular intervals and to stop charging or discharging as soon as possible when the end of charging or discharging threshold is reached.

According to a development, the voltage threshold corresponds for example to a state of charge threshold according to the type of battery. On discharging, the threshold can thus be chosen to prevent deep discharging of the battery, and on charging the threshold can be chosen so as to prevent the nuisance chemical reactions of overcharging.

To prevent damage to the battery, the voltage threshold that depends on the current and the measured temperature preferably corresponds to a value that is representative of a state of charge of the battery of 20% to 30%. This threshold enables the battery to be protected against degradation such as sulphation for lead batteries, or metal lithium deposition in lithium batteries, and further enables a minimum available power to be maintained in the battery. The voltage threshold corresponding to the end of charging criterion preferably corresponds to a value representative of a state of charge of the battery of 75% to 90%. A state of charge of 75% will enable degassing of lead batteries to be limited, 80% will enable the lifetime of LiMH batteries to be increased, and 90% will avoid having to balance the different elements of the battery when the latter is made from lithium. In other words, the voltage threshold determined according to measurements of current Ib and temperature Tb can be representative of the state of charge of the battery, i.e. of its physical state. By stopping charging or discharging at the right moment, it is possible to preserve the integrity of the battery over time.

If the battery remains constantly between these charging and discharging voltage thresholds, the disturbance chemical reactions are greatly reduced and the long-term autonomy of the battery is greatly improved.

The state of charge corresponds to an indicator of a battery in general expressed as a percentage. At 0% the battery is considered as being empty and at 100% the battery is considered as being full. Typically the state of charge varies according to the quantity of current stored in the battery with respect to the nominal rated capacity of the battery.

In other words, in order to stop charging or discharging at the right moment, it is preferable for determination of said voltage threshold to be performed by selecting the voltage threshold associated with the pair of measurements, i.e. the one obtained by measurement of temperature $T_b$ and measurement of current $I_b$ flowing in battery 1, from among a predefined set of pairs of measurements. The end of charging and discharging criteria will thus be finely tuned so as to preserve the integrity of the battery as far as possible. For this, the voltage threshold is preferably supplied from a table of voltage values. The table can then comprise two inputs, a first input being representative of a current value and a second input being representative of a temperature value. If the measured values of temperature $T_b$ and current $I_b$ do not correspond to a known pair, i.e. if these values do not enable a voltage value to be obtained from the table, the nearest pair to these two values enabling a voltage value to be given can be chosen to determine the voltage threshold corresponding to the end of charging or discharging criterion.

Such a table can be established beforehand under conditions where all the charging or discharging parameters can be fixed (charging/discharging current, temperature, state of charge, etc.). As a particular example, establishing the table comprises the following steps:

providing a plurality of curves representative of voltage $U_b$ at the terminals of battery 1 according to the state of charge of battery 1, each curve being established for a pair formed by battery temperature $T_b$ and current $I_b$ flowing in battery 1, for each curve, determining a voltage value from a state of charge of battery 1, adding each voltage value determined in this way to the table.

Each voltage value is thus accessible by fixing the first and second inputs of the table respectively to the current and to the temperature that enabled said voltage value to be determined.

Figure 4:
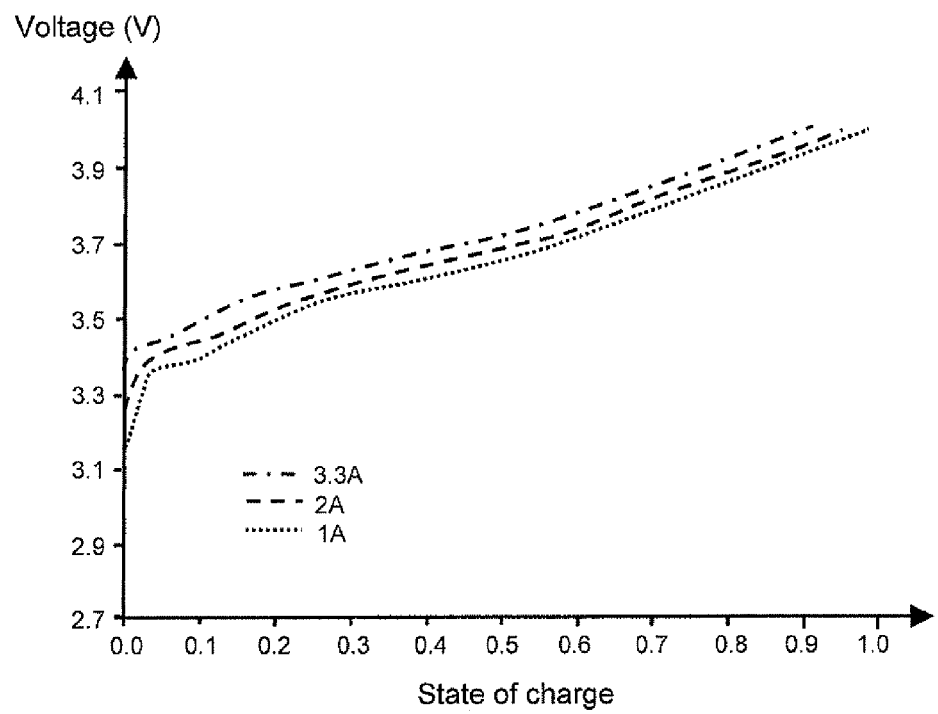
FIG. 4 represents plots of voltage variations of a battery versus the state of charge for different charging current values at a fixed temperature.

As a particular example of an embodiment of the table, for charging of battery 1, a step consists in establishing a plurality of curves such as those illustrated in FIG. 4, at a fixed temperature (25° C. for the example of FIG. 4), representative of the voltage versus the state of charge of the battery (1 representing a state of charge of 100%). Each curve is associated with a different charging rate (3.33 A, 2 A and 1 A for FIG. 4). The same step is repeated for a plurality of different temperatures.

In order to determine the voltage values associated with charging of the battery, the state of charge is fixed between 75% and 90% of the state of charge of the battery. Reading of FIG. 4 thus enables a voltage to be fixed for a current/temperature pair. For example, by fixing the state of charge at 80% (0.8 in FIG. 4), the 25° C. and 1 A pair is associated with a voltage value of about 3.825V. When the charging method is implemented, if the measured values $T_b$ and $I_b$ are respectively equal to 25° C. and 1 A, reading of the table will therefore provide the value of 3.825V precisely as voltage threshold.

Concerning establishment of the set of pairs associated with discharging, the curves of FIG. 4 are replotted from charged batteries for different discharge currents. The state of charge is then fixed between 20% and 30% of the state of charge of the battery.

According to a particular embodiment, it is possible to arrange for any measurement of a temperature $T_b$ of battery 1 and of a charging or discharging current $I_b$ to correspond to a predefined voltage threshold value. Thus, temperature $T_b$ of the battery varying in a first predefined range, measurement of the temperature is performed by a temperature sensor 3 delivering a first value from among N values representative of the first range. Current $I_b$ flowing in battery 1 varying within a second predefined range, measurement of current $I_b$ is performed by measuring means 4 delivering a second value from among M values representative of the second range. The table then contains N*M voltage values, each voltage being accessible by a single temperature and current pair formed by said first and second values. In other words, temperature sensor 3 and current measuring means 4 each have a predetermined resolution enabling them to measure a certain number of values in a predetermined range.

As a particular example illustrating the embodiment described in the foregoing, the first range corresponds to an interval of 0° C. to 60° C. outside which use of the battery is not permitted as it is considered as causing internal damage of the latter. The resolution of the temperature sensor is 1° C., what is meant by resolution being the precision of measurement of the associated sensor. If the actual temperature is 1.8° C., then the measured temperature will be 2° C. According to this postulate, the set of temperatures able to be measured represents a set N of 61 values. On the same principle, taking current measuring means 4 with a resolution of 0.01 A over a range from 0 A to 2 A representing the current that renewable energy source 2 can supply when charging, the current measurement range is an interval defined by the boundaries [0.01; 2], which represents a set N of 200 different current values measurable by current measuring means 4.

12,200 pairs are therefore finally obtained (i.e. 12,200 voltage values stored in the table) covering all the possible measurement combinations.

The table described in the foregoing can then be completed by pairs determined from extrapolation of the pairs fixed when the curves were established to finally obtain at the outcome a set of N*M different pairs representative of all the measurable possibilities. Preferably, in order to improve extrapolation and make the latter as precise as possible, the boundaries of the first range and the boundaries of the second range form part of the pairs fixed for establishing the curves.

Preferably, to enable the number of pairs to be determined, each temperature value of the first range is separated from at least another temperature value of the first range by a temperature difference that is smaller than or equal to the precision of measurement of temperature sensor 3, and each current value of the second range is separated from at least another current value of the second range by a current difference that is smaller than or equal to the precision of measurement of measuring means 4.

A possible representation of the set of pairs is presented in the form of a matrix of M lines and N columns. Each line corresponds to a different current able to be measured by current measuring means 4 according to their resolution, and each column corresponds to a different temperature able to be measured by temperature sensor 3 according to its resolution.

Figure 2:
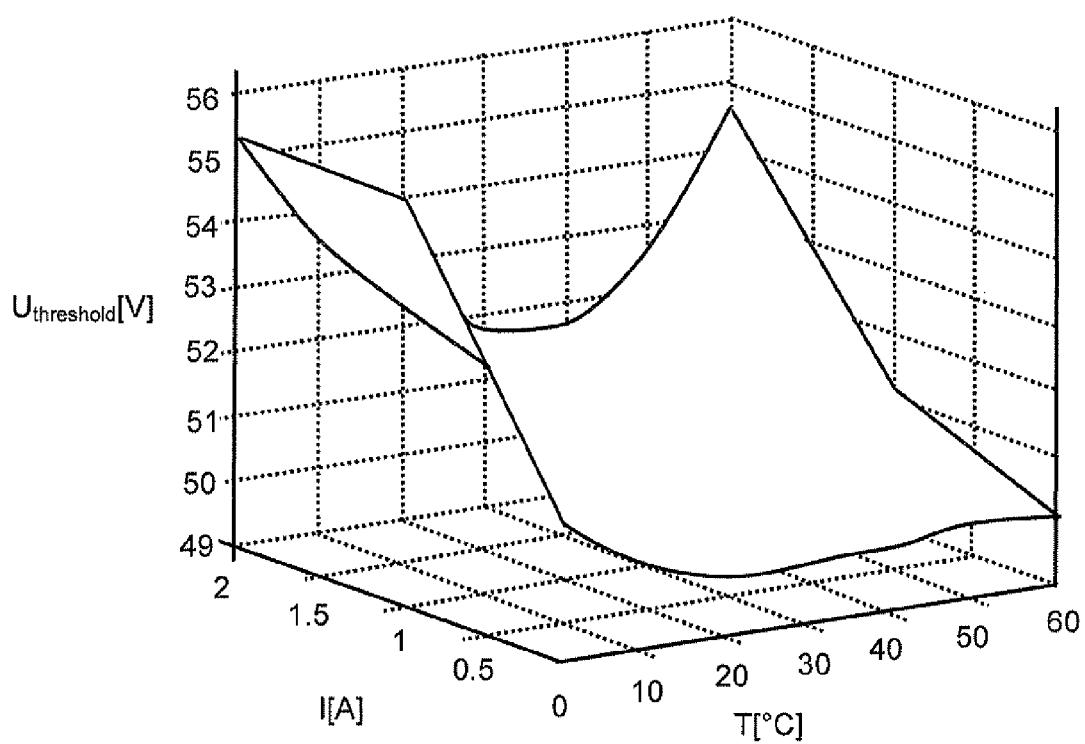
FIG. 2 represents a 3-dimensional mapping of the voltage thresholds representative of a state of charge of 80% versus the charging current and temperature.
Figure 3:
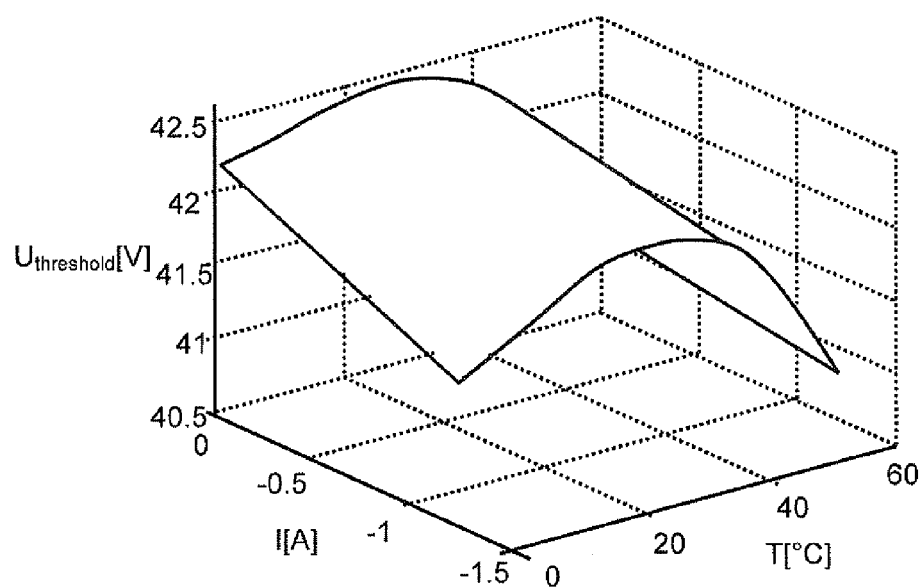
FIG. 3 represents a 3-dimensional mapping of the voltage thresholds representative of a state of charge of 30% versus the charging current and temperature.

It is thus possible to establish the 3-dimensional mappings of FIGS. 2 and 3. FIG. 2 represents the set of voltage values $U_{threshold}$ associated with a state of charge of 80% versus current I and temperature T. FIG. 3 illustrates the set of voltage values $U_{threshold}$ associated with a state of charge of 30% versus current I and temperature T.

Another possible representation can be a database with three fields (temperature, current, voltage) embedded in a battery charge and discharge regulator the sole key of which is a temperature value and a current value.

Any other voltage value storage means able to lead to rapid determination of the voltage threshold to be determined can also be envisaged.

Two sets of pairs can in fact be distinguished. A first set corresponds to the values associated with the voltage threshold representative of the end of charging criterion, and a second set corresponds to the values associated with the voltage threshold representative of the end of discharging criterion.

Although they are represented as being separate for embodiment purposes, the set of pairs associated with charging and the set of pairs associated with discharging can be presented in the form of a single table, the second range comprising the current values having a negative lower boundary and a positive upper boundary.

By means of such a table to determine the end of charging or discharging criterion, use of the battery is only authorized in an electrochemical window that does not cause physical damage to the battery. This enables a longer lifetime of the battery to be obtained while at the same time preserving the integrity of the latter. Replacement of batteries is therefore less frequent.

According to an implementation of the method, if measured current $I_b$ is negative, the method is in discharge phase and discharging is stopped when voltage $U_b$ at the terminals of the battery becomes lower than or equal to the defined voltage threshold.

According to another implementation of the method, if measured current $I_b$ is positive, the method is in charging phase and charging is stopped when voltage $U_b$ at the terminals of the battery becomes greater than or equal to the defined voltage threshold.

In the course of the lifetime of a battery, certain physical and chemical values of the latter change. The pairs of measurements and their associated voltage thresholds can then differ from those that were previously established. According to a particular embodiment, it may therefore be interesting to perform correction of the voltage thresholds. In other words, for each pair of measurements, the associated voltage threshold can be corrected after a first time representative of a period of use of battery 1. Such a correction can for example be performed by analyzing a physical characteristic of battery 1 between a second time prior to the first time and a third time subsequent to the first time.

According to a particular development, correction of the voltage thresholds is a function of the variation of the internal resistance of the battery charged to 100% of its capacity between a second time prior to the first time and a third time subsequent to the first time. In other words, after a predefined period of use, a recharging step of battery 1 is performed to 100% of its capacity, and the internal resistance of battery 1 thus charged is measured, preferably at a temperature belonging to the previously defined first range. This internal resistance is then compared with an internal resistance measured under the same conditions at a previous time to the predefined period of use. For each pair of measurements, the associated voltage threshold is then corrected according to the result of comparison of the internal resistances.

For example if the internal resistance of the battery drops by 20% between the second time and the third time, all the voltage thresholds can then be modified by 20%.

It is possible to generalize by the following formula:

$$\frac{\Delta V}{V} = \alpha \frac{\Delta R}{R}$$

with $$\frac{\Delta V}{V}$$

the variation to be applied on the voltage thresholds, $$\frac{\Delta R}{R}$$

the measured variation of the internal resistance of the battery, and $\alpha$ a factor being able for example to be comprised between 0.8 and 1.2.

The internal resistance of battery 1 can be measured by methods such as the voltage versus current curve or by impedance spectroscopy. Any other method available to the person skilled in the art can naturally also be used.

The second time preferably corresponds to measurement of the internal resistance of a new battery charged to 100% of its capacity.

The particular example above describes use of the internal resistance of the battery to correct the voltage thresholds. The person skilled in the art will naturally be able to measure other physical values to correct the voltage thresholds.

Figure 5:
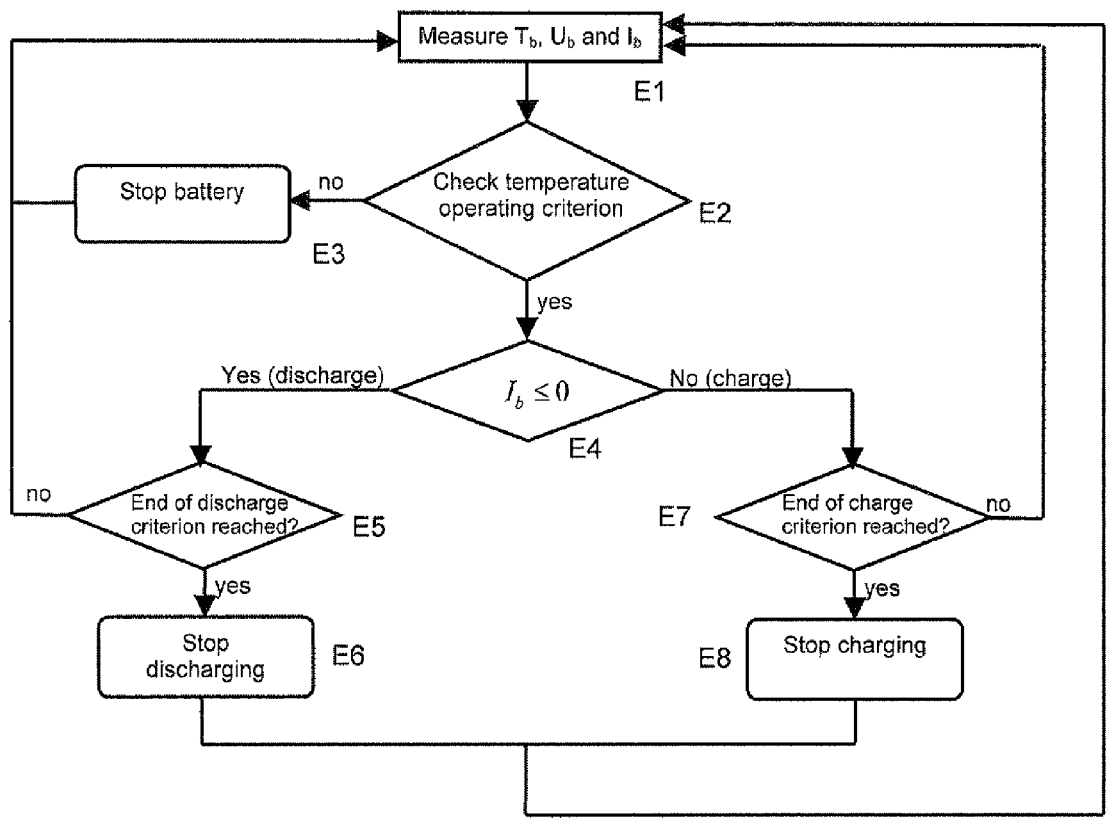
FIG. 5 illustrates a decisional diagram integrated in a battery charge and discharge regulator.

According to a particular example of operation, the decisional diagram of operation of a regulator of a standalone system as described in the foregoing is illustrated in FIG. 5. This diagram comprises a first step E1 in which a voltage $U_b$, a current $I_b$ and a temperature $T_b$ are measured, preferably simultaneously. In a step E2 successive to step E1, an operating criterion is verified. This operating criterion preferably corresponds to a range of temperatures in which operation of the battery is authorized, for example between 0° C. and 60° C. Outside this range, the temperature fosters nuisance reactions in the battery, thereby causing damage to the latter. It will thus be possible to prevent charging and discharging of the battery outside the temperature range. If the measured temperature $T_b$ is outside the range (no output), then the battery is stopped (step E3) and we return to step E1. On the contrary, if the measured temperature is within the operating range of the battery (yes output), the regulator goes on to a step E4 of checking of the measured current $I_b$. If the measured current $I_b$ is lower than or equal to 0 A, then the regulator goes on to a step E5 corresponding to checking of the end of discharging criterion from the values of current $I_b$ and of temperature $T_b$ measured in step E1. If this end of discharging criterion is reached, i.e. the measured voltage $U_b$ is lower than or equal to the discharge voltage threshold, discharging is then stopped (step E6), then the regulator returns to step E1, if not the regulator returns directly to step E1 (no output of E5). On the other hand, at the level of step E4, if the measured current is greater than 0 A, then the regulator goes on to a step E7 corresponding to checking the end of charging criterion from the values of current $I_b$ and temperature $T_b$ measured in step E1. If this end of charging criterion is reached, i.e. the measured voltage is greater than or equal to the charging voltage threshold, charging is then stopped (step E8), then the regulator returns to step E1, if not the regulator returns directly to step E1 (no output of step E7).

Such a decisional diagram can be integrated in the software of a regulator performing control of charging/discharging of the battery.

The invention claimed is:

1. A method for charging or discharging a battery, the method comprising:
   measuring a voltage at terminals of the battery;
   measuring a temperature of the battery by a temperature sensor delivering a first value from among N values representative of a range of temperatures;
   measuring a current flowing in the battery by a current sensing element delivering a second value from among M values representative of a range of currents;
   determining an end of charging voltage threshold or an end of discharging voltage threshold according to a pair of measurements formed by the measured current and the measured temperature;
   comparing the measured voltage with the end of charging voltage threshold or with the end of discharging voltage threshold; and
   stopping charging or discharging of the battery when the end of charging voltage threshold or the end of discharging voltage threshold is reached,
   wherein the end of charging voltage threshold or the end of discharging voltage threshold is supplied by a table with two inputs, a first input being representative of a current value and a second input being representative of a temperature value, the table including N*M voltage values, and further comprising establishing the table by:
   filling the table with a set of end of charging voltage thresholds or end of discharging voltage thresholds determined for at least two predefined current values; and
   filling the table with the end of charging voltage threshold or the end of discharging voltage threshold by extrapolation from the set of end of charging voltage thresholds or end of discharging voltage thresholds, each extrapolated end of charging voltage threshold or end of discharging voltage threshold is separated from at least one other extrapolated end of charging voltage threshold or end of discharging voltage threshold by a current difference that is equal to a precision of measurement of the current sensing element.

2. The method according to claim 1, wherein the table is predetermined by:
   providing a plurality of curves representative of the voltage at the terminals of the battery according to the state of charge of the battery, each curve being established for one pair formed by a fixed temperature of the battery and a fixed current flowing in the battery,
   for each curve, determining a voltage value from a state of charge of the battery, and
   adding each determined voltage value to the table.

3. The method according to claim 1, wherein when the measured current flowing in the battery is negative, the method is in discharge phase, and discharging is stopped when the voltage at the terminals of the battery becomes lower than or equal to the end of discharging voltage threshold.

4. The method according to claim 1, wherein when the measured current is positive, the method is in charging phase, and charging is stopped when the voltage at the terminals of the battery becomes greater than or equal to the end of charging voltage threshold.

5. The method according to claim 1, further comprising correcting the end of charging voltage threshold or the end of discharging voltage threshold for each pair of measurements, after a first time representative of a period of use of the battery.

6. The method according to claim 5, further comprising:
charging the battery to 100% capacity;
determining an internal resistance value of the battery;
comparing the internal resistance value of the battery with an initial internal resistance value of the battery determined so as to calculate a variation of the internal resistance of the battery; and
correcting all of the end of charging voltage thresholds or the end of discharging voltage thresholds in the table according to the variation of the internal resistance of the battery.

7. The method according to claim 6, wherein the measurement of the initial internal resistance is performed on a new battery charged to 100% capacity.

8. The method according to claim 5, wherein the correction is based on the following formula:

$$\frac{\Delta V}{V} = \alpha \frac{\Delta R}{R}$$

with $$\frac{\Delta V}{V}$$

being the variation to be applied on the voltage thresholds, $$\frac{\Delta R}{R}$$

being the measured variation of the internal resistance of the battery, and

α being a factor between 0.8 and 1.2.

9. The method according to claim 1, further comprising simultaneously measuring the voltage at the terminals of the battery, measuring the current flowing in the battery and measuring the temperature of the battery.

10. The method according to claim 1, wherein the end of charging voltage threshold is defined to stop the charging when a state of charge of the battery is between 75% and 90% of capacity, the end of charging voltage threshold depending on the type of battery.

11. The method according to claim 1, wherein the end of discharging voltage threshold is defined to stop the discharging when a state of charge of the battery is between 20% and 30% of capacity, the end of discharging voltage threshold depending on the type of battery.

12. A method for charging or discharging a battery, the method comprising:
calculating an initial internal resistance of the battery by means of a charge to 100% of capacity;
after a predetermined time of use, charging the battery to 100% of capacity and calculating a new internal resistance of the battery;
calculating a variation of the internal resistance of the battery based on a difference between the initial internal resistance and the new internal resistance;
measuring a voltage at terminals of the battery;
measuring a current flowing in the battery;
measuring a temperature of the battery;
determining an end of charging voltage threshold or an end of discharging voltage threshold according to the measured current, the measured temperature and the variation of the internal resistance of the battery;
comparing the measured voltage with the end of charging voltage threshold or with the end of discharging voltage threshold; and
stopping charging or discharging the battery when the end of charging voltage threshold or the end of discharging voltage threshold is reached.

13. The method according to claim 12, wherein the correction is based on the following formula:

$$\frac{\Delta V}{V} = \alpha \frac{\Delta R}{R}$$

with $$\frac{\Delta V}{V}$$

being the variation to be applied on the voltage thresholds, $$\frac{\Delta R}{R}$$

being the measured variation of the internal resistance of the battery, and

α being a factor between 0.8 and 1.2.

14. The method according to claim 12, wherein the measurement of the initial internal resistance is performed on a new battery charged to 100% capacity.

15. The method according to claim 12, further comprising simultaneously measuring the voltage at the terminals of the battery, measuring the current flowing in the battery and measuring the temperature of the battery.

16. The method according to claim 12, wherein the end of charging voltage threshold is defined to stop the charging when a state of charge of the battery is between 75% and 90% of capacity, the end of charging voltage threshold depending on the type of battery.

17. The method according to claim 12, wherein the end of discharging voltage threshold is defined to stop the discharging when a state of charge of the battery is between 20% and 30% of capacity, the end of discharging voltage threshold depending on the type of battery.

18. The method according to claim 12, wherein the end of charging voltage threshold or the end of discharging voltage threshold is supplied by a table with two inputs, a first input being representative of a current value and a second input being representative of a temperature value.

19. The method according to claim 18, wherein the table is predetermined by:
providing a plurality of curves representative of the voltage at the terminals of the battery according to the state of charge of the battery, each curve being established for one pair formed by a fixed temperature of the battery and a fixed current flowing in the battery;

for each curve, determining a voltage value from a state of charge of the battery; and adding each determined voltage value to the table.

20. The method according to claim 19, further comprising:

measuring the temperature of the battery by a temperature sensor delivering a first value from among N values representative of a first range of temperature; and measuring the current flowing in the battery by a current sensing element delivering a second value from among M values representative of a second range of current, wherein the table includes N*M voltage values.

21. The method according to claim 20, further comprising:

establishing the table by:

filling the table with a set of end of charging voltage thresholds or end of discharging voltage thresholds determined for at least two predefined current values; and filling the table with the end of charging voltage threshold or the end of discharging voltage threshold by extrapolation from the set of end of charging voltage thresholds or end of discharging voltage thresholds, each extrapolated end of charging voltage threshold or end of discharging voltage threshold is separated from at least one other extrapolated end of charging voltage threshold or end of discharging voltage threshold by a current difference that is equal to a precision of measurement of the current sensing element.

22. The method according to claim 12, wherein the measured current flowing in the battery is negative, the method is in discharge phase, and discharging is stopped when the voltage at the terminals of the battery becomes lower than or equal to the end of discharging voltage threshold.

23. The method according to claim 12, wherein the measured current is positive, the method is in charging phase, and charging is stopped when the voltage at the terminals of the battery becomes greater than or equal to the end of charging voltage threshold.

* * * * *